United States Patent [19]

Bauer

[11] 4,415,701

[45] Nov. 15, 1983

[54] WATER SOLUBLE THICKENERS

[75] Inventor: Barry J. Bauer, Summit, N.J.

[73] Assignee: Celanese Corporation, New York, N.Y.

[21] Appl. No.: 434,144

[22] Filed: Oct. 12, 1982

[51] Int. Cl.$^3$ .................. C08G 65/08; C08G 4/00
[52] U.S. Cl. .................. 524/612; 528/361; 528/421; 560/264; 568/601
[58] Field of Search .............. 524/612; 528/421, 361; 560/264; 568/601

[56] References Cited

U.S. PATENT DOCUMENTS

| | | | |
|---|---|---|---|
| 2,473,994 | 6/1949 | Gresham | 568/601 |
| 3,644,224 | 2/1972 | Hani et al. | 528/402 X |
| 3,652,465 | 3/1972 | Takakura et al. | 528/403 X |
| 4,189,609 | 2/1980 | Langdon | 568/601 |

Primary Examiner—Earl A. Nielsen
Attorney, Agent, or Firm—Donald L. Cox; Charles B. Barris

[57] ABSTRACT

Disclosed in this invention are copolymers containing about 0.5% to about 20%, by weight, of a $C_{10}$–$C_{36}$ monoepoxide and about 99.5% to about 80%, by weight, of a 1,3 dioxolane. These copolymers are useful in increasing the viscosity of aqueous systems employed in various end uses, such as coatings and hydraulic fluids.

15 Claims, No Drawings

WATER SOLUBLE THICKENERS

BACKGROUND OF INVENTION

This invention relates to organic polymers useful as thickeners for aqueous systems. More particularly, this invention relates to 1,3 dioxolane/monoepoxide copolymers which may be employed as water soluble thickeners.

In the prior art various types of water soluble thickeners have been prepared. For example, in U.S. Pat. No. 3,770,684, thickeners are prepared by forming an ether, ester or urethane onto a water soluble, polymeric, dihydroxy terminated polyether. In U.S. Pat. No. 4,228,277, non-ionic cellulosics are utilized as thickeners. In U.S. Pat. No. 4,288,639, it is disclosed that copolymers of 12-18 carbon, aliphatic, alpha olefin oxides and lower alkylene oxides may be prepared and used as liquid thickeners. Finally, U.S. Pat. No. 4,304,902 discloses copolymers of ethylene oxide and long-chained epoxides.

One of the problems evident in preparing many of the prior art thickeners, such as the non-ionic cellulosics disclosed in U.S. Pat. No. 4,228,277, and the materials disclosed in U.S. Pat. No. 4,304,902, is that these materials often require the use of a reaction cosolvent during polymer preparation. These cosolvents are difficult to remove and add unnecessary processing steps and expense to the processes for preparing the polymers involved.

Thus, it is an object of this invention to prepare novel compositions which are useful as aqueous-based thickeners.

It is another object of this invention to prepare novel water soluble thickeners.

Another object of this invention is to prepare thickener compositions employing reaction steps which do not require the use of difficult to remove reaction solvents.

Yet another object of this invention is to prepare water soluble thickeners having unique properties, which thickeners may be employed in coating emulsions and in hydraulic fluids.

These and other objectives are obtained by preparing the compositions of this invention.

SUMMARY OF INVENTION

The instant invention involves the discovery that the viscosity of an aqueous system may significantly be increased by adding at least about 1.0%, by weight, based upon the total system, of a polymer prepared by copolymerizing, in the presence of a cationic polymerization catalyst, about 0.5% to about 20%, by weight, of a generally straight-chained $C_{10}$–$C_{36}$ monoepoxide with about 99.5% to about 80%, by weight, of a 1,3 dioxolane.

DETAILED DESCRIPTION OF INVENTION

The 1,3 dioxolanes which may be used in this invention are represented by the general formula

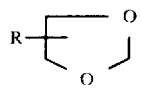

wherein R is either hydrogen or $C_1$–$C_3$ alkyl. The only requirement with respect to the R group is that it may not be interferingly reactive with the copolymerization reaction between the 1,3 dioxolane and the epoxide. Examples of the 1,3 dioxolanes include 1,3 dioxolane, 2 methyl 1,3 dioxolane, 4 methyl 1,3 dioxolane, and mixtures thereof.

The second major component of the instant invention is a $C_{10}$–$C_{36}$ monoepoxide. Preferably the monoepoxide is a 1,2 terminal epoxide, and most preferably the epoxide contains from about 12-25 carbon atoms in a relatively straight chain. The monoepoxides useful in this invention may be represented by the following general formulae:

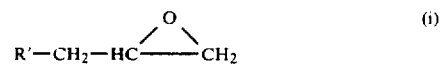

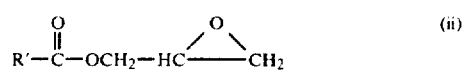

or

wherein R' is $C_7$–$C_{33}$, preferably $C_9$–$C_{22}$. As shown by the above formulae, the monoepoxides may be glycidyl esters, glycidyl ethers, or simply relatively straight-chained glycidyl materials, as shown in formula (i). In the most preferred instance, R' is simply an n-alkane, although R' may also be a secondary alkane or a tertiary alkane. In addition, it is possible to employ epoxide materials wherein the epoxide group is not in the terminal position, although these materials are not preferred. It is also contemplated that mixtures of various epoxides may be employed. For example, an epoxide selected from formula (i) may be mixed with one selected from formula (iii). Also mixed epoxides having the same general formula may be used. Since many of the $C_{10}$–$C_{36}$ epoxides are oil or fatty acid derived, and since such oils or acids often contain a mixture of oligomers, many of the epoxides useful herein will be available commercially as a mixture of, for example, $C_{20}$, $C_{22}$ and $C_{24}$ n-alkane epoxides.

The amount of the monoepoxide material which is used may vary from about 0.5-20%, based upon the total weight of the comonomer, with the 1,3 dioxolane amount varying from about 99.5% to about 80% on the same basis. It has surprisingly been discovered, moreover, that the preferred and maximum viscosity is obtained when about 2.5% to about 7.5%, by weight, of the monoepoxide is employed. When the amount of the monoepoxide is increased above about 10%, the viscosity of aqueous solutions employed using the thickeners prepared herein drops and eventually the thickeners become insoluble.

In addition, in order to prepare materials having optimum properties, up to about 25%, by weight, based on the total monoepoxide weight, of an alkyl or aryl monoepoxide containing less than about 10 carbon atoms may be used as a comonomer herein. Examples of such monoepoxides include butyl glycidyl ether, phenyl glycidyl ether, ethylene oxide, propylene oxide, butylene oxide and the like.

Moreover, it is also possible to incorporate up to about 10%, based on the total monoepoxide weight, of an aromatic or aliphatic polyepoxide of types well known in the art. These materials are prepared by reacting an excess of an epihalohydrin with a diol or a diphenol in the presence of a Lewis acid catalyst and dehydrohalogenating utilizing a base. Examples of the diols include ethylene glycol, propanediol, and hexanediol and examples of the diphenols include resorcinol and the bisphenols. The incorporation of larger amounts of these materials as comonomers, however, will result in a loss of water solubility and in a rapid increase in the molecular weight of the thickeners. Therefore, only small amounts of these diepoxides should be added to the composition prepared herein.

In addition to the monoepoxide and the 1,3 dioxolane monomer, it is also possible to employ up to about 10%, by weight, of trioxane, based on the total 1, 3 dioxolane weight, in order to obtain particular polymeric properties in the finished product.

The reaction between the epoxide and the dioxolane is catalyzed using well known cationic polymerization catalysts, including various halides such as boron, tin, iron, zirconium and aluminum, chlorides and bromides, their corresponding ether complexes, as well as diazonium salts of various types, including p-chlorophenyldiazoniumhexafluorophosphate and p-nitrophenyldiazoniumhexafluorophosphate. The amount of the reaction catalyst can vary quite widely ranging up to about 10%, preferably up to about 2%, based upon the total monomer weight.

As pointed out above, one of the major advantages of the copolymers of this invention is that they may be prepared without the use of a cosolvent or reaction solvent of any type. In other words, the polymers may be polymerized in bulk. Accordingly, all monomers are added to the reactor simultaneously along with the catalyst and the entire mixture is heat at temperatures which may range from about 50° C. to about 100° C. (Polymerization may also be carried out at room temperature, although temperatures of this lower magnitude unnecessarily extend the polymerization reaction time.) In addition, the polymerization reaction may be carried out at slightly elevated pressures. The time for carrying out the reaction may vary, depending upon the reactants, catalysts, pressure and temperature chosen, from about 2-3 hours to as long as 25 hours or more. The reaction extent is monitored by following the viscosity of the reactants. The reaction is deemed complete when the maximum viscosity is obtained.

Following completion of the reaction, the catalyst is neutralized by adding a small amount of a base, such as an amine. In addition, in certain instances the copolymeric product may be extracted with methanol or another solvent for the monomers employed in the invention so as to remove any unreacted monomers which remain.

In order to increase the viscosity of an aqueous solution the thickeners of this invention are simply dissolved in the particular aqueous system. The amount of the thickener which is added may vary greatly. However, it should comprise at least about 1% and preferably at least about 3%, of the total solution weight. Although there is no maximum upper limit, the practical upper limit for using the compositions of this invention is about 20%. Above this point the viscosity of the aqueous solution becomes too high for most applications.

The water soluble thickening compositions of the instant invention find utility in a wide variety of end uses. They may be employed, for example, as thickeners (particularly for aqueous hydraulic fluids), as water retention aids, and as suspension agents in certain polymerization processes. In addition, these compositions may be used in preparing mineral oil-in-water emulsions and may be employed in combination with various surfactants for use in a wide variety of surfactant end uses. (It is preferred that the thickeners prepared herein be employed in conjunction with nonionic or anionic surfactants.) The compositions of this invention may also be used to form latex paints which exhibit improved flow and viscosity properties.

In the following examples all parts and percentages are by weight unless otherwise indicated:

EXAMPLE 1

Into a sealed glass polymerization tube were added 100 g. of dioxolane and 2 ml of a solution prepared by mixing 2 g. of the dibutyl ether of boron trifluoride and 18 g. of cyclohexane. This mixture was heated to 50° C. and held at this temperature for 19 hours. A polymer resulted having an inherent viscosity in methylene chloride of 0.56 and a 25° C. Brookfield viscosity at 5 percent solids in water of 10 cps.

EXAMPLE 2

Example 1 was repeated except that it was modified with 5%, by weight, of Vikolox 16, which is a 16 carbon atom monoepoxide material having a molecular weight of 240 and a melting point of 22° C. It is available from the Viking Chemical Company. The epoxide/1,3 dioxolane reaction mixture was held for 19 hours at 50° C. in an oil bath. The resulting product exhibited an inherent viscosity of 0.62 at 25° C. in methylene chloride and a 5% aqueous 25° C. Brookfield viscosity of 12000 cps.

Thus the viscosity of the modified product prepared in Example 2 dissolved at the 5% level in water is several orders of magnitude greater than is the viscosity of the material prepared in Example 1 which does not contain the n-alkane epoxide.

EXAMPLES 3-9

Utilizing essentially the same reaction conditions as set forth in Example 2, various modifications of the materials in question were prepared and evaluated in the following table.

In the table, the column headed "Hydrophobe" contains an identification of the particular monoepoxide employed.

Monoepoxide "A" is a Vikolox 20-24*, a mixture of 47% $C_{20}$, 44% $C_{22}$, and 9% $C_{24}$ carbon-containing monoepoxides having an average molecular weight of 313 and a melting point of 34°-40° C.

Monoepoxide "B" is Vikolox 18*, which is an 18 carbon monoepoxide having a molecular weight of 268 and a melting point of 26° C.

Monoepoxide "C" is Vikolox 12*, which is a 12 carbon monoepoxide having an average molecular weight of 184.

Monoepoxide "D" is Vikolox 24-28*, which is a mixture of 24% $C_{24}$, 45% $C_{26}$, 22% $C_{28}$ and 9% $C_{30}$ carbon containing monoepoxides having an average molecular weight of 384 and a melting point of 37°-45° C.

*Available from the Viking Chemical Company.

The column labeled "% Hydrophobe" shows the weight percent of the hydrophobe listed in the first column which was used as a comonomer with the 1,3 dioxolane.

The column headed "IV" shows the inherent viscosity of the dioxolane/epoxide copolymer in methylene chloride at 25° C.

The column headed "Brookfield" shows the 25° C. Brookfield viscosity of a five weight percent solution of the copolymer in water.

The column headed "Initiator" sets out the amount by volume or weight as indicated of the following initiators:

Initiator "X" is a 10% by weight solution of the dibutyl ether of boron trifluoride dissolved in cyclohexane.

Initiator "Y" is a solution of 0.57 g. of p-chlorophenylhexafluorophosphate dissolved in 10 ml of nitrobenzene.

Initiator "Z" is solid p-chlorophenylhexafluorophosphate.

With respect to initiators X, Y and Z, the amounts added are per 100 g. of comonomer mixture.

The column headed "R/X Time" sets out the copolymerization reaction time in hours.

| Example | % Hydrophobe | % Hydrophobe | I.V. | Brookfield | Initiator | R/X Time |
|---------|--------------|--------------|------|------------|-----------|----------|
| 3 | A | 5 | 0.47 | 50,000 | 2 ml X | 19.8 |
| 4 | — | 0 | 0.61 | 10 | 0.8 ml X | 19.0 |
| 5 | A | 1 | 0.79 | 500 | 1.6 ml Y | 22.8 |
| 6 | B | 10 | 0.34 | 1,000 | .1 g Z | 6.2 |
| 7 | C | 5 | 0.47 | 180 | .1 g Z | 4.6 |
| 8 | A | 5 | ND* | 50,000 | 2 ml X | 19.2 |
| 9 | D | 5 | ND* | 40,000 | 2 ml X | 19.2 |

*Not determined.

As can be seen from the above table, the viscosity of the copolymers increases dramatically whenever a hydrophobe is added to the monomer composition of the thickening agent prepared according to the instant invention.

What is claimed is:

1. A water soluble thickening compound comprising a copolymer prepared by copolymerizing about 0.5% to about 20%, by weight, of a $C_{10}$–$C_{36}$ monoepoxide with about 99.5% to about 80%, by weight, of a 1,3 dioxolane.

2. The compound of claim 1 wherein the monoepoxide is selected from the group consisting of:

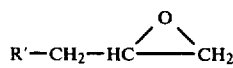

(i)

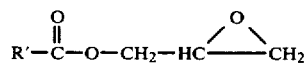

(ii)

or

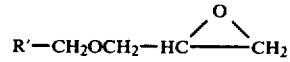

(iii)

wherein R' is $C_7$–$C_{33}$ and the 1,3 dioxolane is represented by the general formula

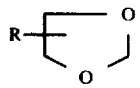

wherein R is $C_1$–$C_3$ alkyl.

3. The compound of claim 1 wherein the dioxolane is selected from 1,3 dioxolane, 2 methyl 1,3 dioxolane, 4 methyl 1,3 dioxolane and mixtures thereof.

4. The compound of claim 1 wherein the monoepoxide is a $C_{10}$–$C_{36}$ n-alkane terminal epoxide.

5. The compound of claim 1 wherein the dioxolane is present at about the 99% to 90% level, and the monoepoxide is present at about the 1% to 10%, by weight, level.

6. The compound of claim 1 wherein up to about 25%, based upon the total monoepoxide weight, of a monoepoxide containing up to about 10 carbon atoms is added as a comonomer.

7. The compound of claim 1 wherein up to about 10%, based on the total monoepoxide weight, of a diepoxide is added as a comonomer.

8. The compound of claim 1 wherein up to about 10%, based on the total 1,3 dioxolane weight, of trioxane is added as a comonomer.

9. A water soluble thickening compound comprising a copolymer prepared by copolymerizing about 0.5 to about 20 percent, by weight, of a $C_{12}$–$C_{25}$ n-alkane monoepoxide and about 99.5 to about 80 percent, by weight, of 1,3 dioxolane.

10. A process for increasing the viscosity of an aqueous-based system, which comprises adding to the system at least about 2%, by weight, of the compound of claim 1.

11. A process for increasing the viscosity of an aqueous-based system, which comprises adding to the system at least about 2%, by weight, of the compound of claim 2.

12. A process for increasing the viscosity of an aqueous-based system which comprises adding to the system at least about 2%, by weight, of the compound of claim 9.

13. A process for increasing the viscosity of an aqueous-based system, which comprises adding to the system at least about 3%, by weight, of the compound of claim 1.

14. A process for increasing the viscosity of an aqueous-based system, which comprises adding to the system at least about 3%, by weight, of the compound of claim 2.

15. A process for increasing the viscosity of an aqueous-based system which comprises adding to the system at least about 3%, by weight, of the compound of claim 9.

* * * * *